United States Patent [19]

Awaji et al.

[11] 4,129,609
[45] Dec. 12, 1978

[54] METHOD FOR IMPROVING STORAGE STABILITY OF EPOXY ESTER THERMOSETTING RESINS WITH THIURAM COMPOUNDS

[75] Inventors: Toshio Awaji, Amagasaki; Daisuke Atobe, Suita, both of Japan

[73] Assignee: Nippon Shokubai Kagaku Kogyo Co., Ltd., Osaka, Japan

[21] Appl. No.: 814,480

[22] Filed: Jul. 11, 1977

[30] Foreign Application Priority Data

Jul. 12, 1976 [JP] Japan .................................. 51-82020

[51] Int. Cl.² ............................................. C08L 63/00
[52] U.S. Cl. ................................. 260/837 R; 260/836; 260/875
[58] Field of Search ............. 260/836, 837 R, 45.7 R, 260/45.7 S, 47 EN, 2 EP, 47 EP, 31.8 E, 33.6 EP, 875

[56] References Cited

U.S. PATENT DOCUMENTS

| | | | |
|---|---|---|---|
| 3,004,949 | 10/1961 | Chevassus | 260/47.75 |
| 3,256,226 | 6/1966 | Fekete et al. | 260/23.5 |
| 3,377,406 | 4/1968 | Newey et al. | 260/837 |
| 3,773,856 | 11/1973 | Takiyama et al. | 260/836 |
| 3,960,981 | 6/1976 | Vargiu | 260/837 R |

*Primary Examiner*—Theodore E. Pertilla
*Attorney, Agent, or Firm*—Omri M. Behr

[57] ABSTRACT

A method for improving storage stability of a thermosetting resin, which comprises adding a thiuram compoound to the thermosetting resin comprising a reaction product of an epoxy resin with an α,β-unsaturated monocarboxylic acid dissolved in a polymerizable olefinic unsaturated compound, said thiuram compound having in one molecule thereof at least one atomic group expressed by the following general formula I:

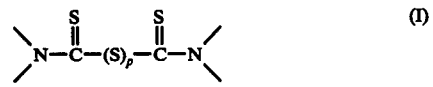

wherein p is an integer of 1 to 4, and being used in an amount of 0.0001 to 2.0 parts by weight per 100 parts by weight of said reaction product.

47 Claims, No Drawings

METHOD FOR IMPROVING STORAGE STABILITY OF EPOXY ESTER THERMOSETTING RESINS WITH THIURAM COMPOUNDS

BACKGROUND OF THE INVENTION

1. Field of the Invention

This invention relates to a method for improving storage stability of an anaerobically hardenable thermosetting resin. More particularly, it relates to a method for improving storage stability of an anaerobically hardenable thermosetting resin (hereinafter referred to as epoxy ester resin) dissolving a reaction product of an epoxy resin with and $\alpha,\beta$-unsaturated monocarboxylic acid (the reaction product will be hereinafter referred to as epoxy ester) into a polymerizable olefinic unsaturated compound (hereinafter referred to as an unsaturated monomer) and also an anaerobically hardenable thermosetting resin composition with improved storage stability. The term "anaerobically hardenable thermosetting resin" herein used is intended to imply that which is chemically stable for a long period of time in the presence of a molecular oxygen containing gas such as air but which is considerably lowered in storage stability and tends to gel within a short period of time in the absence of molecular oxygen.

2. Prior Art

In recent years, a number of thermosetting resins have been practically applied in various fields due to development of significantly advanced techniques therefore. Of many thermosetting resins, unsaturated polyester resins are rapidly increasing in demand because of their excellency in property and wide aplicability. In particular, unsaturated polyesters reinforced with glass fibres (hereinafter referred to as FRP) are now in wide use in the field of composite material. However, as the range of use of the FRP resin is increasing, there is induced a strong demand of high quality FRP resins having excellent properties such as high elongation, high physical strength, excellent resistances to corrosion and heat, etc., which can hardly be satisfied with the unsaturated polyester resins. Under these circumstances, epoxy ester resins have been studied and developed in order to satisfy the above-mentioned demand. Especially in the field where corrosion resistance is required, application of the epoxy ester resins has been intensively studied, leading now to practical application as tanks, pipes, ducts, etc. However, the epoxy ester resins have some disadvantages, one of which is that they are very susceptible to anaerobic hardening. This undesirability places a limit on application of the resins. In general, the epoxy ester resins which have been once prepared are irresistibly placed in hermetically sealed vessels such as cans, drums, containers, tanks, etc., for purposes of transportation or storage. However, the resin is unstable in the hermetically sealed state because of its tendency to anaerobic hardening and thus tends to gel during the storage or transportation, presenting a serious problem on practical application. Undesirably the anaerobic tendency is not reduced at all even if known stabilizers for thermosetting resin such as, for example, quinones, hydroquinones, nitro compounds and the like, are used in an increased amount. In order to prevent the resin from gelling during transportation or storage, it is general to cause the resin in a vessel to contact with air by taking off the seal, and agitating or shaking the vessel at regular intervals. However, this method requires much time and labor and will be rather troublesome, resulting gellation in some cases.

SUMMARY OF THE INVENTION

It is therefore an object of the present invention to provide a method for improving storage stability of an epoxy ester resin.

It is another object of the present invention to provide an epoxy ester resin composition which has excellent physical properties without gelling during transportation or storage.

These objects can be achieved by adding a thiuram compound to the epoxy ester resin comprising a reaction product of an epoxy resin with an $\alpha,\beta$-unsaturated monocarboxylic acid dissolved in a polymerizable olefinic unsaturated monomer, said thiuram compound having in one molecule thereof at least one atomic group expressed by the following formula I:

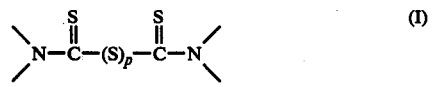

wherein p is an integer of from 1 to 4, in an amount of 0.0001 to 2.0 parts by weight per 100 parts by weight of the reaction product.

DETAILED DESCRIPTION OF THE INVENTION

The epoxy resins suitable for the preparation of the epoxy ester include, for example, a glycidyl polyether of bisphenol compounds (hereinafter referred to as a bisphenol-base epoxy resin), a glycidyl polyether of a novolac resin (hereinafter referred to as a novolac-base epoxy resin) and a glycol-base epoxy resin.

The bisphenol-base epoxy resins are those expressed by the general formula II:

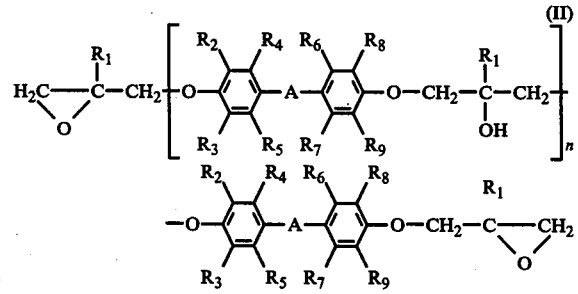

wherein $R_1$ represents H or $CH_3$, $R_2$, $R_3$, $R_4$, $R_5$, $R_6$, $R_7$, $R_8$ and $R_9$ independently represent H, Cl, Br or F, A represents an alkylene group containing 1 to 8 carbon atoms, S, O or

and n is zero or an integer of 1 to 10. The epoxy resin expressed by the above formula is not necessarily to have a single value of n. It is general that the epoxy resin is a mixture of several kinds of molecules having different molecular weights. That is, the resin contains a major part of molecules having a molecular weight corresponding to $n = n_1$ and a minor part of molecules having molecular weights corresponding to $n = n_1 - 2$, $n_1 - 1, n_1 + 1, n_1 + 2$ and so on, with an epoxy equivalent ranging from 170 to 1,600. For instance, the bisphenol-base epoxy resin having an epoxy equivalent of 170 to 225 contains a major proportion of molecules having a molecular weight corresponding to $n = 0$ and minor proportions of those corresponding to $n = 1$ and $n = 2$, while the resin with an epoxy equivalent of 400 to 600 contains a major proportion of molecules of a molecular weight corresponding to $n = 2$ and minor proportions of molecules of molecular weights corresponding to $n = 1, n = 3$, and also $n = 0$ and $n = 4$, respectively. Typical of the bisphenol-base epoxy resins having epoxy equivalents of 170 to 225 commercially available are known under the trade names of Epikote #828 available from Shell Chemical Co., U.S.A., DEN-331 from Dow Chemical Co., U.S.A., Araldite GY-250 from Ciba-Geigy Ltd., Switzerland, Sumi-Epoxy ELA-128 from Sumitomo Chemical Co., Japan, Epiclon 840 from Dainippon Ink & Chemicals Co., Japan, etc. The epoxy resins having epoxy equivalents of 400 to 600 are those known under the trade names of Epikote #1001, DEN-661, Araldite #6071, Sumi-Epoxy ESA-011, Epiclon 1050, etc. In addition, examples of halogen-containing bisphenol-base epoxy resins include DER-511 available from Dow Chemical Co., U.S.A., Araldite 8011 from Ciba-Geigy Ltd., Switzerland, Epiclon 152 from Dainippon Ink & Chemicals Co., Japan, etc. Though the bisphenol-base epoxy resins available from several companies are particularly indicated above, other bisphenol-base epoxy resins expressed by the foregoing general formula II and having an epoxy equivalent of 170 to 1,600 may be likewise used.

The epoxy resins based on novolacs are polyfunctional epoxy resins obtained by reacting epichlorohydrin with novolac resins and expressed by the following general formula III

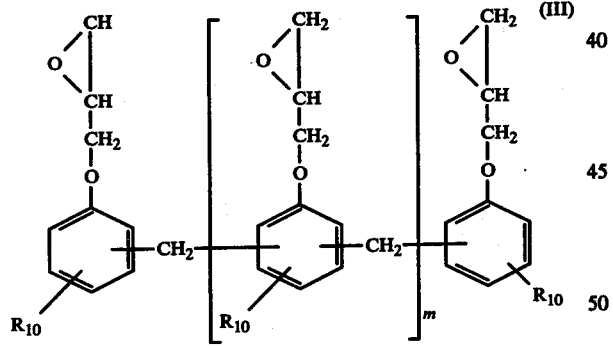

wherein $R_{10}$ represents H or $CH_3$, and m is zero or an integer of from 1 to 12. Similarly to the case of the bisphenol-base epoxy resins, the novolac-base resin is not necessarily required that m is a single value but may be a mixture of several kinds of molecules with different values of m. Representative of commercially available novolac-base epoxy resins are known under the trade names of DEN-431 and DEN-438 both available from Dow Chemical Co., U.S.A., Epikote 152 and Epikote 154 from Shell Chemical Co., U.S.A., EPN-1138 and ECN-1280 from Ciba-Geigy Ltd., Switzerland, Epichlon N-740 from Dainippon Ink & Chemical Co., Japan, Sumi-Epoxy ESCN-220L from Sumitomo Chemicals Co., Japan, etc.

The $\alpha,\beta$-unsaturated monocarboxylic acids suitable for the purpose of the invention include acrylic acid, methacrylic acid, partially esterified maleic acid or fumaric acid with an alkyl residue of $C_1$-$C_8$. Especially when acrylic acid or methacrylic acid is employed, the obtained epoxy ester has a chemical structure containing $\alpha,\beta$-unsaturated end group, with an advantage that the hardened resin has excellent properties such as high mechanical property and excellent resistance to corrosion, heat and the like.

In order to suitably control the molecular weight and reactivity of the epoxy ester and also to improve the flexibility and thermal properties thereof, part, e.g., 0-40 mol%, of the $\alpha,\beta$-unsaturated monocarboxylic acid to be reacted with the epoxy resin may be substituted with a saturated polycarboxylic acid, an unsaturated polycarboxylic acid or an anhydride thereof. Examples of such polycarboxylic acids or anhydrides thereof include succinic acid, adipic acid, citric acid, phthalic acid, isophthalic acid, terephthalic acid, halogenated phthalic acids, tetrahydrophthalic acid, 3,6-endomethylene tetrahydrophthalic acid, 3,6-endodichloromethylene tetrachlorophthalic acid, pyromellitic acid, trimellitic acid, maleic acid, fumaric acid, itaconic acid, citraconic acid, mesaconic acid, gluconic acid, etc., and anhydrides thereof.

The $\alpha,\beta$-unsaturated monomers for dissolving the epoxy ester include, for example, aromatic vinyl compounds such as styrene, vinyltoluene, $\alpha$-methyl styrene, halogenated styrene, divinylbenzene and the like, acrylates or methacrylates such as methyl acrylate, methyl methacrylate, ethyl acrylate, ethyl methacrylate, ethylene glycol diacrylate, ethylene glycol dimethacrylate, etc., and diallkyl phthalate, and mixtures thereof. Of these, styrene, diallyl phthalate and mixtures thereof are especially preferable.

The epoxy ester resin per se can be readily prepared by any of known methods. One of the methods is that which comprises reacting an epoxy resin with an $\alpha,\beta$-unsaturated monocarboxylic acid such that 1 mole of the epoxy group reacts with 0.8 to 1.2 moles of the carboxylic group, in the presence of a reaction catalyst such as lithium chloride, triethylamine, a hydrochloric acid salt of dimethyl benzylamine or the like, and of a polymerization inhibitor such as hydroquinone, tertiary butyl catechol or the like at a temperature of 80° to 160° C. The resulting epoxy ester may be readily dissolved in an unsaturated monomer to obtain an epoxy ester resin.

Further, the above reaction is feasible in the presence of an unsaturated monomer thereby giving an epoxy ester resin directly.

As a matter of course, a mixture of two epoxy resins having different epoxy equivalents is usable for reaction with an $\alpha,\beta$-unsaturated monocarboxylic acid. For example, a mixture of a bisphenol-base-epoxy resin (X) having an epoxy equivalent of 170 to 225 and a bisphenol-base epoxy resin (Y) having an epoxy equivalent of 400 to 600 in a molar ratio of $0.2 \leq X < 0.4:0.6 < Y \leq 0.8$ (wherein $X + Y = 1.0$) is particularly suitable, the reaction of such mixture with the $\alpha,\beta$-unsaturated monocarboxylic acid being conducted in a manner similar to the above-mentioned reaction. The resulting epoxy ester is dissolved in the unsaturated monomer to give an epoxy ester resin.

The epoxy ester resin containing two epoxy resin components with different epoxy equivalents may also be obtainable by mixing an epoxy ester resin (I-X) which is substantially composed of a reaction product of a bisphenol-base epoxy resin (X) having an epoxy equivalent of 170 to 225 and an α,β-unsaturated monocarboxylic acid, and an unsaturated monomer, with an epoxy ester resin (II-Y) which is substantially composed of a reaction product of a bisphenol-base epoxy resin (Y) having an epoxy equivalent of 400 to 600 and an α,β-unsaturated monocarboxylic acid, and an unsaturated monomer in such a manner that the resin (X) constituting one component of the first-mentioned reaction product and the resin (Y) constituting one component of the second-mentioned reaction product are mixed in a molar ratio of $0.2 \leq X < 0.4 : 0.6 < Y \leq 0.8$ (wherein $X + Y = 1.0$).

The epoxy ester resin using a mixture of epoxy resins having different epoxy equivalents has the following excellent characteristics. That is, such resin is superior, when hardened, in elongation to that derived from one bisphenol-base epoxy resin with an epoxy equivalent of 400 to 600. In addition, the resins using the epoxy resin mixture is also much excellent in alkali resistance.

The amount of the unsaturated monomer is in the range of 10 to 70% by weight, preferably 30 to 60% by weight, of the epoxy ester resin. With an amount less than 10% by weight of the epoxy ester resin, said resin becomes too high in viscosity and is thus not practical. While, larger amounts than 70 wt% will lower the physical characteristics of the resin due to the lack in amount of epoxy ester.

The epoxy ester resin may be added with some kinds of additives ordinarily employed in the art of unsaturated polyester resin, such as a storage stabilizer typical of which is copper naphthenate, a polymerization accelerator including cobalt octoate, methyl acetoacetate, dimethylaniline or the like, or other additives such as wax, silicone or the like. As a matter of course, the method of the invention will be influenced by no means by the addition of the additives.

The thiuram compound useful in the present invention is one which has in one molecule thereof at least one atomic group expressed by the following formula

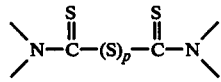

wherein p is an integer of 1 to 4, preferably 1 or 2, and most preferably 1. Examples of the typical thiuram compounds include tetramethylthiuram monosulfide, tetraethylthiuram monosulfide, tetrabutylthiuram monosulfide, bis(diethyleneoxyl)thiuram monosulfide, dipentamethylenethiuram monosulfide, bis(trimethylthiuram monosulfide)ethlene, tetramethylthiuram disulfide, tetraethylthiuram disulfide, tetrabutylthiuram disulfide, diphenyldimethylthiuram disulfide, diphenyldiethylthiuram disulfide, bis(diethyleneoxyl)thiuram disulfide, dipentamethylenethiuram disulfide, tetramethylthiuram tetrasulfide, dipentamethylenethiuram tetrasulfide, tetramethylthiuram trisulfide, bis(trimethylthiuram disulfide)ethylene, etc. Apart from the just-mentioned thiuram compounds, other thiuram compounds represented by the abovementioned formula may be likewise used. These thiuram compounds may be used singly or in combination of two or more.

The amount of the thiuram compound to be used is in the range of 0.0001 to 2 parts by weight, preferably 0.001 to 0.5 parts by weight, per 100 parts of the epoxy ester (i.e., reaction product of an epoxy resin with an α,β-unsaturated monocarboxylic acid.) Less amounts are unfavorable since a significant effect does not produce, while the amounts exceeding 2 parts by weight do not appear to offer any distinct advantage in spite of their increased expenses. In addition thereto, larger amounts will tend to lower physical properties, such as corrosion resistance and mechanical strengths, of the epoxy ester resin when hardened.

Addition of the thiuram compound is feasible by a variety of methods, e.g., it may be added during the course of preparation of an epoxy ester resin or after completion of the preparation. Since the thiuram compounds are susceptible to decomposition when exposed to high temperatures, it should preferably be added under temperature conditions below 120° C.

The present invention will be particularly described in more detail by way of the following working examples, which should not be construed as limiting thereto the present invention. In examples, parts are by weight unless otherwise indicated.

Preparation of Resin A

Into a reaction vessel equipped with an agitator, a condenser, a thermometer, a gas inlet tube and a heating unit were placed 946 parts of a bisphenol-base epoxy resin (Araldite #6071, product of Ciba-Geigy Ltd.), 176 parts of methacrylic acid, 0.1 part of hydroquinone and 3.2 parts of triethylamine, which were reacted at 110° C. for 5 hours under air stream. At the end of this time, the reaction mixture had acid value of 7. Into the system containing the resulting reaction product was placed 748 parts of styrene monomer to obtain an epoxy ester resin (hereinafter referred to as resin A). The resin A was a transparent, light yellowish liquid and had a viscosity of 11 poises at 25° C.

Preparation of Resin B

Into the same vessel as used in Preparation of Resin A were placed 180 parts of a novolac-base epoxy resin (Epikote 154, product of Shell Chemical Co.) having an epoxy equivalent of 180, 87 parts of methacrylic acid, 0.02 parts of hydroquinone and 0.8 parts of triethylamine, which were reacted at 110° C. for 6 hours under air stream. At the end of this time, the reaction mixture had acid value of 6. Into the system containing the resulting reaction product was placed with 180 parts of styrene monomer to obtain an epoxy ester resin (hereinafter referred to as resin B). The resin B was a transparent, brown liquid and had a viscosity of 1.3 poises at 25° C.

Preparation of Resin C

Into the same vessel as used in Preparation of Resin A were placed 370 parts of a bisphenol-base epoxy resin (Araldite GY-260, product of Ciba-Geigy Ltd.) having an epoxy equivalent of 185, 176 parts of methacrylic acid, 0.1 part of hydroquinone and 3.2 parts of triethylamine, which were reacted at 110° C. for 5 hours under air stream. At the end of this time, the reaction mixture had acid value of 7. Then, 364 parts of diallylphthalate monomer was placed into the system containing the reaction product to obtain an epoxy ester resin (hereinafter referred to simply as resin C).

Preparation of Resin D

The reaction product (epoxy ester) was obtained by the same manner as Preparation of Resin C. Then, 182 parts of stylene monomer and 182 parts of diallyl phthalate monomer were placed into the system containing the reaction product to obtain an epoxy ester resin (hereinlater referred to simply as resin D).

EXAMPLE 1

100 parts of the resin A was added with 0.05 parts of tetramethylthiuram monosulfide to obtain an epoxy resin composition. 1 kg of said resin composition was placed in a tin having a capacity of 1l and hermetically sealed for storage at 40° C. After 60 days, the seal was taken off, revealing that the liquid was uniform and did not show any change in appearance.

For comparison, 1 kg of the resin A alone was similarly placed in a 1l tin and hermetically sealed, and kept at 40° C. After 10 days, gellation took place and thus the resin was unfit for use.

EXAMPLE 2

100 parts of the resin B was added with 0.001 part of tetraethylthiuram monosulfide to obtain an epoxy ester resin composition. 1 kg of said resin composition was placed in a 1l tin can and then hermetically sealed for storage at 40° C. After 60 days, it was found that said resin composition was uniform and did not show any change in appearance.

For comparative purpose, 1 kg of the resin B alone was placed in a 1l tin-can and hermetically sealed for storage at 40° C. After 10 days, gellation took place and thus the resin was unfit for use.

EXAMPLES 3–12

Example 1 was repeated using 100 parts of the resin A, B, C or D and different kinds and amounts of thiuram compounds shown in Table 1 below. The test results are shown in the Table.

Table 1

| Example | epoxy ester resin | thiuram compound | amount (parts) | state of resin observed after storage at 40° C |
|---|---|---|---|---|
| 3 | resin A | tetrabutylthiuram monosulfide | 0.5 | uniform liquid even after 60 days |
| 4 | " | dipentamethylene-thiuram monosulfide | 0.0005 | gelled after 53 days |
| 5 | resin B | bis(trimethylthiuram monosulfide)ethylene | 0.05 | uniform liquid even after 60 days |
| 6 | " | diphenyldiethyl-thiuram monosulfide | 1.0 | " |
| 7 | " | tetramethylthiuram monosulfide and tetraethylthiuram monosulfide | 0.01 0.01 | " |
| 8 | resin A | dipentamethylene-thiuram monosulfide and diphenyldimethyl-thiuram monosulfide | 0.03 | " |
| 9 | resin C | tetramethylthiuram monosulfide | 0.01 | " |
| 10 | " | tetramethylthiuram disulfide | 0.01 | " |
| 11 | resin D | tetramethylthiuram monosulfide | 0.01 | " |
| 12 | " | tetramethylthiuram disulfide | 0.01 | " |
| Comparison | | | | |
| | resin C | — | — | gelled after 21 days |
| | resin D | — | — | gelled after 14 days |

EXAMPLE 13

100 parts of the resin A was added with 0.05 parts of tetramethylthiuram disulfide to obtain an epoxy ester resin composition. 1 kg of the resulting resin liquid was placed in a 1l tin and hermetically sealed for storage at 40° C. After 60 days, the seal was taken off, revealing that the liquid did not show any change in appearance and was in a uniform state.

EXAMPLE 14

100 parts of the resin B was added with 0.001 part of tetraethylthiuram disulfide to obtain an epoxy ester resin composition. 1 kg of the resulting resin liquid was placed in a 1l tin-can and hermetically sealed for storage at 40° C. After 60 days, the liquid did not show any change with a uniform appearance.

For comparative purpose, 1 kg of the resin B alone was placed in a 1l tin and hermetically sealed for storage at 40° C. Gellation took place after 10 days and thus the resin was unfit for use.

EXAMPLES 15–22

Example 1 was repeated using 100 parts of resin A or B and different kinds and amounts of thiuram compounds indicated in Table 2. The test results are shown in Table 2 below.

Table 2

| Example | epoxy ester resin | thiuram compound | amount parts | state of resin observed when stored at 40° C |
|---|---|---|---|---|
| 15 | resin A | tetrabutylthiuram disulfide | 0.5 | uniform liquid even after 60 days |
| 16 | " | dipentamethylene-thiuram disulfide | 0.0005 | gelled after 53 days |
| 17 | " | tetramethylthiuram trisulfide | 0.01 | uniform liquid even after 60 days |
| 18 | " | dipentamethylene-thiuram tetrasulfide | 0.05 | " |
| 19 | resin B | bis(trimethylthiuram disulfide)ethylene | 0.05 | " |
| 20 | " | diphenyldiethyl-thiuram disulfide | 1.0 | " |
| 21 | " | tetramethylthiuram disulfide and tetramethylthiuram tetrasulfide | 0.01 0.01 | " |
| 22 | resin A | tetramethylthiuram monosulfide and tetrabutylthiuram disulfide | 0.1 0.1 | " |

EXAMPLE 23

Into the same vessel as used in Preparation of Resin A were placed 615 parts of a bisphenol-base epoxy resin (Araldite #6071, product of Cibe-Geigy Ltd.) having an epoxy equivalent of 473, 130 parts of a bisphenol-base epoxy resin (Araldite GY-260, product of Ciba-Geigy Ltd.) having an epoxy equivalent of 185, 176 parts of methacrylic acid, 0.1 part of hydroquinone, and 3.2 parts of triethylamine, which were reacted at 110° C. for 5 hours under air stream. At the end of this time, the reaction mixture had acid value of 7. Then, 650 parts of styrene monomer was placed into the reaction system containing the epoxy ester to give an epoxy ester resin (hereinafter referred to as resin E). The resin E was a transparent, light yellowish liquid and had a viscosity of 5.2 at 25° C.

To 100 parts of the resin E was added 0.02 parts of tetramethylthiuram monosulfide to obtain an epoxy ester resin composition. 1 kg of said resin composition was placed in a 1l tin and hermetically sealed for storage at 40° C. After 60 days, the seal was taken off, revealing that said resin composition did not show any change and was uniform in appearance.

The resin was added with 0.2 parts of cobalt octoate, 0.5 parts of dimethylaniline, and 1.3 parts of methyl ethyl ketone peroxide each per 100 parts of said resin composition. The resulting composition was charged between two glass plates and hardened at 25° C., followed by thermally treating at 110° C. for 2 hours thereby giving a casting plate. The casting plate had a bending strength of 15 kg/mm$^2$, a flexural elongation of 348 kg/mm$^2$, a tensile strength of 8.1 kg/mm$^2$, a tensile modulus of 7.4%, and a Barcol hardness of 35. Three pieces of the casting plate were, respectively, immersed for 4 weeks in an aqueous 40% NaOH solution, an aqueous 30% HNO$_3$ solution and an aqueous 80% H$_2$SO$_4$ solution each maintained at 60° C. Then, the thus immersed pieces were each subjected to a measurement of flexural strength retention percentage, with the results of 115%, 61% and 115%, respectively.

EXAMPLE 24

Into the same vessel as used in Example 23 were placed 946 parts of a bisphenol-base epoxy resin (Araldite #6071, product of Ciba-Geigy Ltd.) having an epoxy equivalent of 473, 176 parts of methacrylic acid, 0.1 part of hydroquinone and 3.2 parts of triethylamine. Then, Example 23 was repeated to obtain an epoxy ester. 748 parts of styrene monomer was placed into the reaction system containing the epoxy ester to give an epoxy ester resin (hereinafter referred to as resin V-B).

The above procedure was repeated except that 370 parts of a bisphenol- epoxy resin (Araldite GY-260, product of Ciba-Geigy LTD.) having an epoxy equivalent of 185 was used as epoxy resin, thereby producing an epoxy ester. Into the reaction system containing the epoxy ester was placed 364 parts of styrene monomer to obtain an epoxy ester resin (hereinafter referred to as resin IV-A).

The resin IV-A and the resin V-B were mixed with each other in different ratios indicated in Table 3 to give four kinds of epoxy ester resin.

Then, the same kind of the thiuram compound as used in Example 23 was added to each of the epoxy ester resin in the same manner as in Example 23 to determine the storage stability. As a result, all the resin were found to be stable and uniform in appearance after completion of the storage test.

The four kinds of the resin were each used to make a casting plate in the same procedure as in Example 23. The casting plates were subjected to a determination of physical properties thereof. The test results are shown in Table 3 below. It will be noted that the determination was conducted in accordance with methods as prescribed in Japanese Industrial Standards (JIS K-6911).

Table 3

| Experiment No. | 1 | 2 | 3 | 4 |
|---|---|---|---|---|
| Resin IV-A(parts | 12 | 17 | 20.7 | 23.6 |
| resin V-B (parts) | 88 | 83 | 79.3 | 76.4 |
| bending strength(kg/mm$^2$) | 15.1 | 15.0 | 15.2 | 14.9 |
| flexural modulus (kg/mm$^2$) | 349 | 344 | 350 | 348 |
| Tensile strength(kg/mm$^2$) | 7.9 | 7.9 | 8.0 | 8.1 |
| tensile elongation (%) | 7.1 | 7.5 | 7.3 | 7.7 |
| percentage of bending strength retained after immersion in acid or alkali solution (%) | | | | |
| 40 % NaOH | 108 | 105 | 112 | 105 |
| 30 % HNO$_3$ | 59 | 57 | 63 | 61 |

Table 3-continued

| Experiment No. | 1 | 2 | 3 | 4 |
|---|---|---|---|---|
| 80 % H$_2$SO$_4$ | 111 | 109 | 115 | 107 |

What is claimed is:

1. A method for improving storage stability of a thermosetting resin, which comprises a adding thiuram compound to the thermosetting resin comprising a reaction product of a 1,2- epoxy resin with an α, β-unsaturated monocarboxylic acid dissolved in a polymerizable olefinic unsaturated compound, said thiuram compound having the formula selected from the group having the formula:

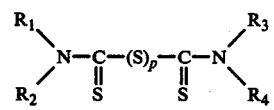

wherein p is an integer of 1 through 4, R$_1$, R$_2$ and R$_3$ are alkyl of 1 to 4 carbon atoms or phenyl, and R$_4$ is alkyl of 1 to 4 carbon atoms, phenyl or

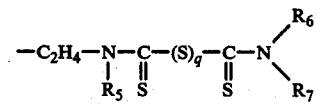

wherein q is an integer of 1 to 4, R$_5$, R$_6$ and R$_7$ are alkyl of 1 to 4 carbon atoms or phenyl, provided that where R$_1$ and R$_2$ are joined, and R$_3$ and R$_4$ are joined, said joined groups are selected from the group consisting of pentamethylene and diethyleneoxy and being used in an amount of 0.0001 to 2.0 parts by weight per 100 parts by weight of said reaction product.

2. A method according to claim 1, wherein said epoxy resin is at least one member from the group consisting of a bisphenol-base epoxy resin expressed by the following general formula II:

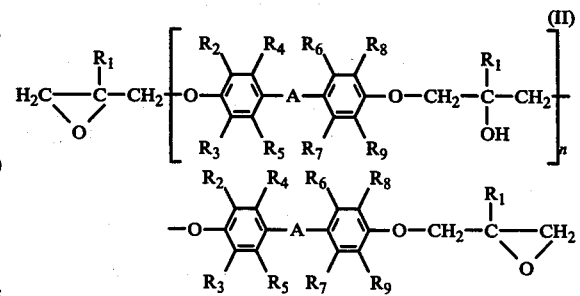

wherein R$_1$ represents H or CH$_3$, R$_2$, R$_3$, R$_4$, R$_5$, R$_6$, R$_7$, R$_8$ and R$_9$ independently represent a member selected from the group consisting of H, Cl, Br and F, A represents a member selected from the group consisting of an alkylene group containing 1 to 8 carbon atoms, S, O and

and n is zero or an integer of 1 to 10, and a novolac-base epoxy resin expressed by the following general formula III:

$$\underset{R_{10}}{\text{(III)}}$$

wherein $R_{10}$ represents H or $CH_3$ and m is zero or an integer of 1 to 12.

3. A method according to claim 2, wherein said epoxy resin is the bisphenol-base epoxy resin of the general formula II.

4. A method according to claim 2, wherein said epoxy resin is the novolac-base epoxy resin of the general formula III.

5. A method according to claim 3, wherein said epoxy resin is a mixture of a bisphenol-base epoxy resin (X) of the general formula II having an epoxy equivalent of 170 to 225 and a bisphenol-base epoxy resin (Y) of the general formula II having an epoxy equivalent of 400 to 600 in a molar ratio of $0.2 \leq X < 0.4 : 0.6 < Y \leq 0.8$ (in which $X + Y = 1.0$).

6. A method according to claim 1, wherein said unsaturated compound is at least one member selected from the group consisting of styrene and diallylphthalate.

7. A method according to claim 6, wherein said unsaturated compound is styrene.

8. A method according to claim 6, wherein said unsaturated compound is diallylphthalate.

9. A method according to claim 1, wherein p in the formula I is an integer of 1 to 2.

10. A method according to claim 9, wherein p in the formula I is 1.

11. A method according to claim 9, wherein p in the formula I is 2.

12. A method according to claim 1, wherein said thiuram compound is used in an amount of 0.001 to 0.5 parts by weight per 100 parts by weight of said reaction product.

13. A method according to claim 5, wherein p in the formula I is an integer of 1 to 2.

14. A method according to claim 10, wherein said thiuram monosulfide is tetramethylthiuram monosulfide.

15. A method according to claim 10, wherein said thiuram monosulfide is tetraethylthiuram monosulfide.

16. A method according to claim 10, wherein said thiuram monosulfide is tetrapropylthiuram monosulfide.

17. A method according to claim 10, wherein said thiuram monosulfide is tetrabutylthiuram monosulfide.

18. A method according to claim 10, wherein said thiuram monosulfide is bis(trimethylthiuram monosulfide)ethylene.

19. A method according to claim 11, wherein said thiuram disulfide is tetramethylthiuram disulfide.

20. A method according to claim 11, wherein said thiuram disulfide is tetraethylthiuram disulfide.

21. A method according to claim 11, wherein said thiuram disulfide is tetrabutylthiuram disulfide.

22. A method according to claim 11, wherein said thiuram disulfide is dipentamethylenethiuram disulfide.

23. A method according to claim 11, wherein said thiuram disulfide is bis(trimethylthiuram disulfide)ethylene.

24. A thermosetting resin composition with improved storage stability comprising a reaction product of a 1,2-epoxy resin with an α, β-unsaturated monocarboxylic acid dissolved into a polymerizable olefinic unsaturated compound, said unsaturated compound being contained in an amount of 10 to 70% by weight of said resin, and a thiuram compound having the formula selected from the group having the formula:

$$\underset{R_2}{\overset{R_1}{\diagdown}} N-\underset{\underset{S}{\parallel}}{C}-(S)_p-\underset{\underset{S}{\parallel}}{C}-N \underset{R_4}{\overset{R_3}{\diagup}}$$

wherein p is an integer of 1 through 4, $R_1$, $R_2$ and $R_3$ are alkyl of 1 to 4 carbon atoms or phenyl, and $R_4$ is alkyl of 1 to 4 carbon atoms, phenyl or $$-C_2H_4-\underset{R_5}{N}-\underset{\underset{S}{\parallel}}{C}-(S)_q-\underset{\underset{S}{\parallel}}{C}-N \underset{R_7}{\overset{R_6}{\diagup}}$$

wherein q is an integer of 1 to 4, $R_5$, $R_6$ and $R_7$ are alkyl of 1 to 4 carbon atoms or phenyl, provided that where $R_1$ and $R_2$ are joined, and $R_3$ and $R_4$ are joined, said joined groups are selected from the group consisting of pentamethylene and diethyleneoxy said thiuram compound being used in an amount of 0.0001 to 2.0 parts by weight of said reaction product.

25. A composition according to claim 24, wherein said epoxy resin is at least one member selected from the group consisting of a bisphenol-base epoxy resin expressed by the following general formula II:

(II)

wherein $R_1$ represents H or $CH_3$, $R_2$, $R_3$, $R_4$, $R_5$, $R_6$, $R_7$, $R_8$ and $R_9$ independently represent a member selected from the group consisting of H, Cl, Br and F, A represents a member selected from the group consisting of an alkylene group containing 1 to 8 carbon atoms, S, O and

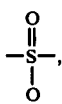

and n is zero or an integer of 1 to 10, and a novolac-base epoxy resin expressed by the following general formula III:

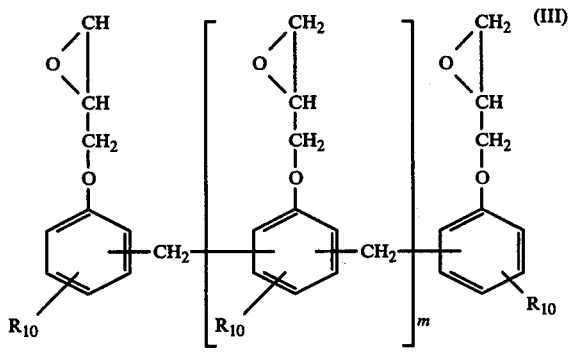

wherein $R_{10}$ represents H or $CH_3$ and m is zero or an integer of 1 to 12.

26. A composition according to claim 25 wherein said epoxy resin is the bisphenol-base epoxy resin of the general formula II.

27. A composition according to claim 25, wherein said epoxy resin is the novolac-base epoxy resin of the formula III.

28. A composition according to claim 26, wherein said epoxy resin is a mixture of a bisphenol-base epoxy resin (X) of the general formula II having an epoxy equivalent of 170 to 225 and a bisphenol-base epoxy resin (Y) of the general formula II having an epoxy equivalent of 400 to 600 in a molar ratio of $0.2 \leq X < 0.4$: $0.6 < Y \leq 0.8$ (in which $X + Y = 1.0$).

29. A composition according to claim 24, wherein said unsaturated compound is at least one member selected from the group consisting of styrene and diallylphthalate.

30. A composition according to claim 29, wherein said unsaturated compound is styrene.

31. A composition according to claim 29, wherein said unsaturated monomer is diallylphthalate.

32. A composition according to claim 24, wherein p in the formula I is an integer of 1 to 2.

33. A composition according to claim 32, wherein p in the formula I is 1.

34. A composition according to claim 32, wherein p in the formula I is 2.

35. A composition according to claim 24, wherein said thiuram compound is used in an amount of 0.001 to 0.5 parts by weight per 100 parts by weight of said reaction product.

36. A composition according to claim 24, wherein said unsaturated compound is used in an amount of 20 to 60% by weight based on said resin.

37. A composition according to claim 28, wherein p in the general formula I is an integer of 1 to 2.

38. A composition according to claim 33, wherein said thiuram monosulfide is tetramethylthiuram monosulfide.

39. A composition according to claim 33, wherein said thiuram monosulfide is tetraethylthiuram monosulfide.

40. A composition according to claim 33, wherein said thiuram monosulfide is tetrapropylthiuram monosulfide.

41. A composition according to claim 33, wherein said thiuram monosulfide is tetrabutylthiuram monosulfide.

42. A composition according to claim 33, wherein said thiuram monosulfide is bis(trimethylthiuram monosulfide)ethylene.

43. A composition according to claim 34, wherein said thiuram disulfide is tetramethylthiuram disulfide.

44. A composition according to claim 34, wherein said thiuram disulfide is tetraethylthiuram disulfide.

45. A composition according to claim 34, wherein said thiuram disulfide is tetrabutylthiuram disulfide.

46. A composition according to claim 34, wherein said thiuram disulfide is dipentamethylenethiuram disulfide.

47. A composition according to claim 34, wherein said thiuram disulfide is bis(trimethylthiuram disulfide)ethylene.

* * * * *